(12) United States Patent  (10) Patent No.: US 8,794,524 B2
Connell, II et al.  (45) Date of Patent: Aug. 5, 2014

(54) SMART SCANNING SYSTEM

(75) Inventors: Jonathan H. Connell, II, Cortlandt-Manor, NY (US); Myron D. Flickner, San Jose, CA (US); Norman Haas, Mount Kisco, NY (US); Thomas J. Hammershoy, Bethel, CT (US); Arun Hampapur, Norwalk, CT (US); Sharathchandra U. Pankanti, Manhasset, NY (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 286 days.

(21) Appl. No.: 11/756,391

(22) Filed: May 31, 2007

(65) Prior Publication Data

US 2008/0296382 A1 Dec. 4, 2008

(51) Int. Cl.
*G06K 7/10* (2006.01)

(52) U.S. Cl.
USPC ............ 235/462.14; 235/462.01; 235/462.24; 235/462.41

(58) Field of Classification Search
CPC .... G07G 1/0054; G07G 1/0045; A47F 9/046; A47F 9/047; G06Q 20/208; G06K 7/1096
USPC ................................. 235/462.01, 454, 462.41
See application file for complete search history.

(56) References Cited

U.S. PATENT DOCUMENTS

| | | |
|---|---|---|
| 4,323,772 A | 4/1982 | Serge |
| 5,331,455 A | 7/1994 | Chang |
| 5,426,282 A | 6/1995 | Humble |
| 5,467,403 A | 11/1995 | Fishbine et al. |
| 5,477,379 A | 12/1995 | Chang |
| 5,497,314 A | 3/1996 | Novak |
| 5,513,264 A | 4/1996 | Wang et al. |
| 5,546,475 A | 8/1996 | Bolle et al. |
| 5,583,686 A | 12/1996 | Chen |
| 5,609,223 A | 3/1997 | Iizaka et al. |
| 5,631,976 A | 5/1997 | Bolle et al. |
| 5,635,697 A | 6/1997 | Shellhammer et al. |
| 5,649,970 A | 7/1997 | Loeb et al. |

(Continued)

FOREIGN PATENT DOCUMENTS

WO 0225506 3/2002

OTHER PUBLICATIONS

Connell II et al., U.S. Appl. No. 12/052,051, Office Action Communication, Feb. 23, 2009, 13 pages.

(Continued)

*Primary Examiner* — Christopher Stanford
(74) *Attorney, Agent, or Firm* — Hoffman Warnick LLC

(57) ABSTRACT

The present invention provides a smart scanning system comprising an integrated scanning and image capture system in which one or more image capture device(s) (e.g., still camera, video camera, etc.) and a barcode scanner are positioned within a common enclosure that is a component of a checkout station. The barcode of item is scanned and an image of the item is recorded. The identity of the item as determined based on the barcode is compared to its appearance as determined based on its image. If the identity is inconsistent with its appearance, a discrepancy is registered. It is then determined whether the discrepancy is due to fraud (e.g., theft) or device error. In the case of the latter, the system can be updated to prevent a repeat of the error.

19 Claims, 3 Drawing Sheets

(56) References Cited

U.S. PATENT DOCUMENTS

| | | | |
|---|---|---|---|
| 5,659,167 A | 8/1997 | Wang et al. | |
| 5,763,864 A * | 6/1998 | O'Hagan et al. | 235/462.07 |
| 5,811,774 A | 9/1998 | Ju et al. | |
| 5,815,200 A | 9/1998 | Ju et al. | |
| 5,883,968 A | 3/1999 | Welch et al. | |
| 5,918,211 A | 6/1999 | Sloane | |
| 6,005,959 A | 12/1999 | Mohan et al. | |
| 6,032,128 A | 2/2000 | Morrison et al. | |
| 6,064,469 A | 5/2000 | Brownstein | |
| 6,122,409 A | 9/2000 | Boggs et al. | |
| 6,287,299 B1 | 9/2001 | Sasnett et al. | |
| 6,310,964 B1 | 10/2001 | Mohan et al. | |
| 6,366,696 B1 * | 4/2002 | Hertz et al. | 382/183 |
| 6,382,357 B1 | 5/2002 | Morrison et al. | |
| 6,434,530 B1 | 8/2002 | Sloane et al. | |
| 6,457,644 B1 | 10/2002 | Collins, Jr. et al. | |
| 6,504,481 B2 | 1/2003 | Teller | |
| 6,556,276 B2 | 4/2003 | Staeheli et al. | |
| 6,592,033 B2 | 7/2003 | Jennings et al. | |
| 6,606,171 B1 | 8/2003 | Renk et al. | |
| 6,726,094 B1 | 4/2004 | Rantze et al. | |
| 6,853,400 B1 | 2/2005 | Matama | |
| 6,991,158 B2 | 1/2006 | Munte | |
| 7,044,370 B2 | 5/2006 | Bellis et al. | |
| 7,118,026 B2 | 10/2006 | Harris et al. | |
| 7,124,058 B2 | 10/2006 | Namaky et al. | |
| 7,143,065 B1 | 11/2006 | Enright | |
| 7,159,770 B2 | 1/2007 | Onozu | |
| 7,168,618 B2 | 1/2007 | Schwartz | |
| 7,196,624 B2 | 3/2007 | Teller | |
| 7,202,780 B2 | 4/2007 | Teller | |
| 7,219,838 B2 | 5/2007 | Brewster et al. | |
| 7,334,729 B2 | 2/2008 | Brewington | |
| 7,337,960 B2 | 3/2008 | Ostrowski et al. | |
| 7,337,962 B2 | 3/2008 | Do et al. | |
| 7,398,923 B2 | 7/2008 | Do et al. | |
| 7,422,147 B2 | 9/2008 | Rosenbaum | |
| 7,442,147 B2 | 10/2008 | Matsuzaki et al. | |
| 7,909,248 B1 | 3/2011 | Goncalves | |
| 2001/0045463 A1 | 11/2001 | Madding et al. | |
| 2002/0004404 A1 | 1/2002 | Squibbs | |
| 2002/0013837 A1 | 1/2002 | Battat et al. | |
| 2002/0070861 A1 | 6/2002 | Teller | |
| 2002/0110374 A1 | 8/2002 | Staeheli et al. | |
| 2002/0121547 A1 | 9/2002 | Wieth et al. | |
| 2002/0161658 A1 | 10/2002 | Sussman | |
| 2002/0194074 A1 | 12/2002 | Jacobs | |
| 2003/0015585 A1 | 1/2003 | Wike et al. | |
| 2003/0024982 A1 | 2/2003 | Bellis, Jr. et al. | |
| 2003/0071725 A1 | 4/2003 | Teller | |
| 2003/0167242 A1 | 9/2003 | Hamilton | |
| 2003/0222147 A1 | 12/2003 | Havens et al. | |
| 2004/0125396 A1 | 7/2004 | Burke | |
| 2004/0252025 A1 | 12/2004 | Silverbrook et al. | |
| 2004/0262391 A1 | 12/2004 | Harris et al. | |
| 2005/0096855 A1 | 5/2005 | Teller | |
| 2005/0145963 A1 | 7/2005 | Saitoh | |
| 2005/0173527 A1 | 8/2005 | Conzola | |
| 2005/0189411 A1 | 9/2005 | Ostrowski et al. | |
| 2005/0189412 A1 | 9/2005 | Hudnut et al. | |
| 2005/0200490 A1 | 9/2005 | Teller | |
| 2005/0211771 A1 | 9/2005 | Onozu | |
| 2005/0237213 A1 | 10/2005 | Teller | |
| 2005/0240478 A1 | 10/2005 | Lubow et al. | |
| 2006/0022051 A1 * | 2/2006 | Patel et al. | 235/462.14 |
| 2006/0032915 A1 | 2/2006 | Schwartz | |
| 2006/0047835 A1 | 3/2006 | Greaux | |
| 2006/0161390 A1 | 7/2006 | Namaky et al. | |
| 2006/0179164 A1 | 8/2006 | Katibian et al. | |
| 2006/0180664 A1 | 8/2006 | Barrett et al. | |
| 2006/0288133 A1 | 12/2006 | Katibian et al. | |
| 2006/0289637 A1 | 12/2006 | Brice et al. | |
| 2006/0290980 A1 | 12/2006 | Terada | |
| 2007/0094080 A1 | 4/2007 | Wiken | |
| 2007/0107016 A1 | 5/2007 | Angel et al. | |
| 2007/0107017 A1 | 5/2007 | Angel et al. | |
| 2007/0107021 A1 | 5/2007 | Angel et al. | |
| 2007/0158417 A1 | 7/2007 | Brewington | |
| 2007/0279244 A1 | 12/2007 | Haughawout et al. | |
| 2007/0288310 A1 | 12/2007 | Boos et al. | |
| 2008/0027796 A1 | 1/2008 | Chaves | |
| 2008/0059281 A1 | 3/2008 | Tower et al. | |
| 2008/0141755 A1 | 6/2008 | Edwards | |
| 2008/0142598 A1 | 6/2008 | Kwan | |
| 2008/0149710 A1 | 6/2008 | Silverbrook et al. | |
| 2008/0149725 A1 | 6/2008 | Rosenbaum | |
| 2008/0154727 A1 | 6/2008 | Carlson | |
| 2008/0226129 A1 | 9/2008 | Kundu et al. | |
| 2009/0119168 A1 | 5/2009 | Otto et al. | |
| 2009/0268941 A1 | 10/2009 | French et al. | |
| 2010/0042236 A1 | 2/2010 | Chow | |
| 2011/0060634 A1 | 3/2011 | Grossman et al. | |
| 2011/0215147 A1 | 9/2011 | Goncalves | |
| 2012/0030003 A1 | 2/2012 | Herwig | |
| 2012/0101881 A1 | 4/2012 | Taylor et al. | |
| 2013/0001295 A1 | 1/2013 | Goncalves | |

OTHER PUBLICATIONS

Connell II et al., U.S. Appl. No. 12/052,051, Office Action Communication, Jan. 6, 2010, 24 pages.

Rankins, U.S. Appl. No. 12/037,270, Notice of Allowance & Fees Due, 18 pages.

Vo, U.S. Appl. No. 12/037,266, Office Action dated Sep. 30, 2013, TTEC-0002, 14 pages.

Stanford, U.S. Appl. No. 11/782,177, Office Action dated Oct. 29, 2013, IBME-0443, 20 pages.

U.S. Appl. No. 12/037,266, Notice of Allowance & Fees Due dated Jan. 24, 2014, 10 pages.

Basit, U.S. Appl. No. 12/037,270, Office Action Communication, Jun. 15, 2011, 22 pages.

Mehta, "Delta Adds Fee to Tickets Not Bought Online; Airlines: The $2 charge applies to all round-trip domestic flights not booked through its Web site. Travel agens criticize the move." Los Angeles Times, Jan. 14, 1999, ProQuest LLC, 3 pages.

Johnson, U.S. Appl. No. 12/052,051, Notice of Allowance & Fees Due, Jul. 14, 2011, 20 pages.

Bolle et al., "VeggieVision: A Produce Recognition System", pp. 1-4, WACV 1996.

Connell II et al., U.S. Appl. No. 12/052,046, filed Mar. 20, 2008, Office Communication dated Apr. 2, 2010, 13 pages.

Connell II, U.S. Appl. No. 11/782,173, Examiner's Answer, Apr. 30, 2010, 11 pages.

Connell II, U.S. Appl. No. 12/052,051, Office Action Communication, Jun. 11, 2010, 32 pages.

Connell II et al., U.S. Appl. No. 11/782,173, Office Action Communication, May 27, 2009, 12 pages.

Connell II et al., U.S. Appl. No. 12/052,051, Office Action Communication, Sep. 8, 2009, 19 pages.

Connell II et al., U.S. Appl. No. 12/052,051, Office Action Communication, Jun. 26, 2009, 19 pages.

Connell II et al., U.S. Appl. No. 11/782,177, Office Action Communication, Nov. 24, 2009, 16 pages.

Connell II et al., U.S. Appl. No. 11/782,173, Office Action Communication, Nov. 27, 2009, 12 pages.

Sahai, "Towards Distributed and Dynamic Network Management", IEEE, 1998, 10 pages.

Reesen, "Virtual World Technologies to Manage a Grid", IBM Corporation, 2008, 19 pages.

Hai, U.S. Appl. No. 12/037,270, Office Action Communication, Aug. 6, 2010, 19 pages.

IBM, RD 411124A, "Web Based Ordering System for Non-Standardised Goods e.g. Fruit, Vegetables Provides View of Item for Selection and Prints Bar Code on Item for Order Processing", Copyright 2009 Derwent Information Ltd., pp. 1-2.

U.S. Appl. No. 11/782,173, Office Action, May 27, 2009, in pp. 1-12.

U.S. Appl. No. 11/782,173, Amendment, Aug. 27, 2009, in pp. 1-13.

Kim, U.S. Appl. No. 11/756,382, Office Action Communication, Sep. 29, 2010, 26 pages.

(56) References Cited

OTHER PUBLICATIONS

Crosland, U.S. Appl. No. 12/052,046, Notice of Allowance & Fees Due, Oct. 7, 2010, 14 pages.
Stanford, U.S. Appl. No. 12/112,318, Office Action Communication, Nov. 8, 2010, 20 pages.
Stanford, U.S. Appl. No. 11/782,177, Office Action Communication, Jun. 19, 2012, 16 pages.
Stanford, U.S. Appl. No. 12/112,318, Office Action Communication, May 3, 2011, 16 pages.
Kim, U.S. Appl. No. 11/756,382, Notice of Allowance & Fees Due, Mar. 24, 2011, 11 pages.
Stanford, U.S. Appl. No. 11/782,177, Office Action Communication, Feb. 28, 2012, 31 pages.
Vo, U.S. Appl. No. 12/037,266, Office Action Communication, Mar. 9, 2012, 13 pages.
Seth, U.S. Appl. No. 12/111,652, Notice of Allowance & Fees Due, Mar. 14, 2012, 7 pages.
Vo, U.S. Appl. No. 12/037,266, Office Action Communication, Jul. 22, 2011, 18 pages.
Vo, U.S. Appl. No. 11/782,173, Decision on Appeal, Apr. 12, 2013, 7 pages.
Vo, U.S. Appl. No. 11/782,173, Notice of Allowance & Fees Due, May 24, 2013, 38 pages.
Vo, U.S. Appl. No. 12/037,266, Office Action Communication, Feb. 6, 2013, 14 pages.
Vo, U.S. Appl. No. 12/037,266, Office Action Communication, Jul. 17, 2012, 14 pages.
Vo, U.S. Appl. No. 12/037,266, Office Action Communication, Jun. 14, 2013, 14 pages.
Stanford, U.S. Appl. No. 11/782,177, Office Action Communication, Jun. 14, 2013, 25 pages.
Vo, U.S. Appl. No. 12/037,266, Office Action Communication, Nov. 17, 2011, 12 pages.
Basit, U.S. Appl. No. 12/037,270, Office Action Communication, Nov. 17, 2011, 21 pages.
Seth, U.S. Appl. No. 12/111,652, Office Action Communication, Dec. 1, 2011, 43 pages.
Vo, U.S. Appl. No. 11/782,173, Examiner's Answer, Apr. 30, 2010, 11 pages.
Johnson, U.S. Appl. No. 12/052,051, Office Action Communication, Dec. 23, 2010, 31 pages.
"Web based ordering system for non-standarised goods e.g. fruit, vegetables provides view of item for selection and prints bar code on item for order processing", IBM Corporation, Jul. 10, 1998, 2 pages, abstract.
Vo, U.S. Appl. No. 12/037,266, Office Action Communication, Jan. 27, 2011, 31 pages.
Basit, U.S. Appl. No. 12/037,270, Office Action Communication, Jan. 21, 2011, 13 pages.
Connell II, et al., U.S. Appl. No. 11/782,177, Final Office Action, Apr. 23, 2010, 18 pages.
Connell II, et al., U.S. Appl. No. 12/052,046, Office Action, Apr. 2, 2010, 13 pages.
U.S. Appl. No. 11/782,177, Examiner's Answer, Dated Jun. 16, 2014, 11 pages.

\* cited by examiner

SMART SCANNING SYSTEM

CROSS-REFERENCE TO RELATED APPLICATIONS

This application is related in some aspects to the commonly owned and co-pending application entitled "Portable Device-Based Shopping Checkout," filed May 31, 2007, and U.S. patent application Ser. No. 11/756,382, the entire contents of which are herein incorporated by reference.

FIELD OF THE INVENTION

The present invention generally relates to a smart scanning system. Specifically, the present invention relates to an integrated system in which a barcode scanner and an image capture device (e.g., image capture device) are commonly contained/housed/positioned.

BACKGROUND OF THE INVENTION

Marketplace security has become a rising concern over recent years. Security and anti-theft concerns have only increased with the pervasiveness of scanners at checkout stations. It has become increasingly frequent for perpetrators to switch and/or alter barcodes so that an item can be obtained for a cheaper price. In addition, many retailers also utilize image capture devices to catch shop lifters. Unfortunately, current placement of image capture devices is either awkward, or of little use during the checkout process. Any current placement of image capture devices near checkout stations inevitably places them in the way of customer's arms, heads or bodies, creating opportunities for collisions, with damage to the person and/or the image capture devices. It also creates problems for the store, with regard to cleaning, theft, camera occlusions, etc.

In view of the foregoing, there exits a need for a solution that solves at least one of the above-referenced deficiencies in the related art.

SUMMARY OF THE INVENTION

In general, the present invention provides a smart scanning system comprising an integrated scanning and image capture system in which one or more image capture device(s) (e.g., still camera, video camera, etc.) and a barcode scanner are positioned within a common enclosure that is a component of a checkout station. The barcode of item is scanned and an image of the item is recorded. It is then determined whether the identity of the item as determined based on the barcode is consistent with its appearance as determined from the image. If not, a discrepancy is registered. It is then determined whether the discrepancy is due to fraud (e.g., theft) or device error. In the case of the latter, the system can be updated to prevent a repeat of the error.

A first aspect of the present invention provides a smart scanning method, comprising: receiving a scan of a barcode of an item via an integrated scanning and image capture system; determining an identity of the item based on the barcode; capturing of an image of the item via the integrated scanning and image capture system; and determining whether the identity is consistent with an appearance of the item as determined from the image.

A second aspect of the present invention provides a smart scanning system, comprising: a module for receiving a scan of a barcode of an item, the barcode being scanned via an integrated scanning and image capture system; a module for determining an identity of the item based on the barcode; a module for receiving of an image of the item, the image being captured via the integrated scanning and image capture system; a module for determining an appearance of the item based on the image; and a module for determining whether the identity is consistent with the appearance.

A third aspect of the present invention provides an integrated scanning and image capture system, comprising: a barcode scanner for scanning a barcode of an item; an image capture device for capturing an image of the item, the barcode scanner and the image capture device both being positioned within a common enclosure.

A fourth aspect of the present invention provides a program item stored on a computer readable medium for smart scanning, the computer readable medium comprising program code for causing a computer system to: receive a scan of a barcode of an item via an integrated scanning and image capture system; determine an identity of the item based on the barcode; capture of an image of the item via the integrated scanning and image capture system; and determine whether the identity is consistent with an appearance of the item as determined from the image.

A fifth aspect of the present invention provides a method for deploying a smart scanning system, comprising: providing a computer infrastructure being operable to: receive a scan of a barcode of an item via an integrated scanning and image capture system; determine an identity of the item based on the barcode; capture of an image of the item via the integrated scanning and image capture system; and determine whether the identity is consistent with an appearance of the item as determined from the image.

A sixth aspect of the present invention provides computer software embodied in a propagated signal for smart scanning, the computer software comprising instructions for causing a computer system to: receive a scan of a barcode of an item via an integrated scanning and image capture system; determine an identity of the item based on the barcode; capture of an image of the item via the integrated scanning and image capture system; and determine whether the identity is consistent with an appearance of the item as determined from the image.

A seventh aspect of the present invention provides a data processing system for smart scanning, comprising: a memory medium having instructions; a bus coupled to the memory medium; and a processor coupled to the bus that when executing the instructions causes the data processing system to: receive a scan of a barcode of an item via an integrated scanning and image capture system; determine an identity of the item based on the barcode; capture of an image of the item via the integrated scanning and image capture system; and determine whether the identity is consistent with an appearance of the item as determined from the image.

An eighth aspect of the present invention provides computer-implemented business method for smart scanning, comprising: receiving a scan of a barcode of an item via an integrated scanning and image capture system; determining an identity of the item based on the barcode; capturing of an image of the item via the integrated scanning and image capture system; and determining whether the identity is consistent with an appearance of the item as determined from the image.

Any of these aspects can include one or more of the following additional aspects: register a discrepancy if the identity is inconsistent with the appearance; determine whether the discrepancy is either an error or fraud; update the integrated scanning and image capture system to prevent the error from being repeated; provide a notification of the discrepancy, the notification being at least one of a visual notification and an audible notification.

BRIEF DESCRIPTION OF THE DRAWINGS

These and other features of this invention will be more readily understood from the following detailed description of the various aspects of the invention taken in conjunction with the accompanying drawings in which.

Figure 1:
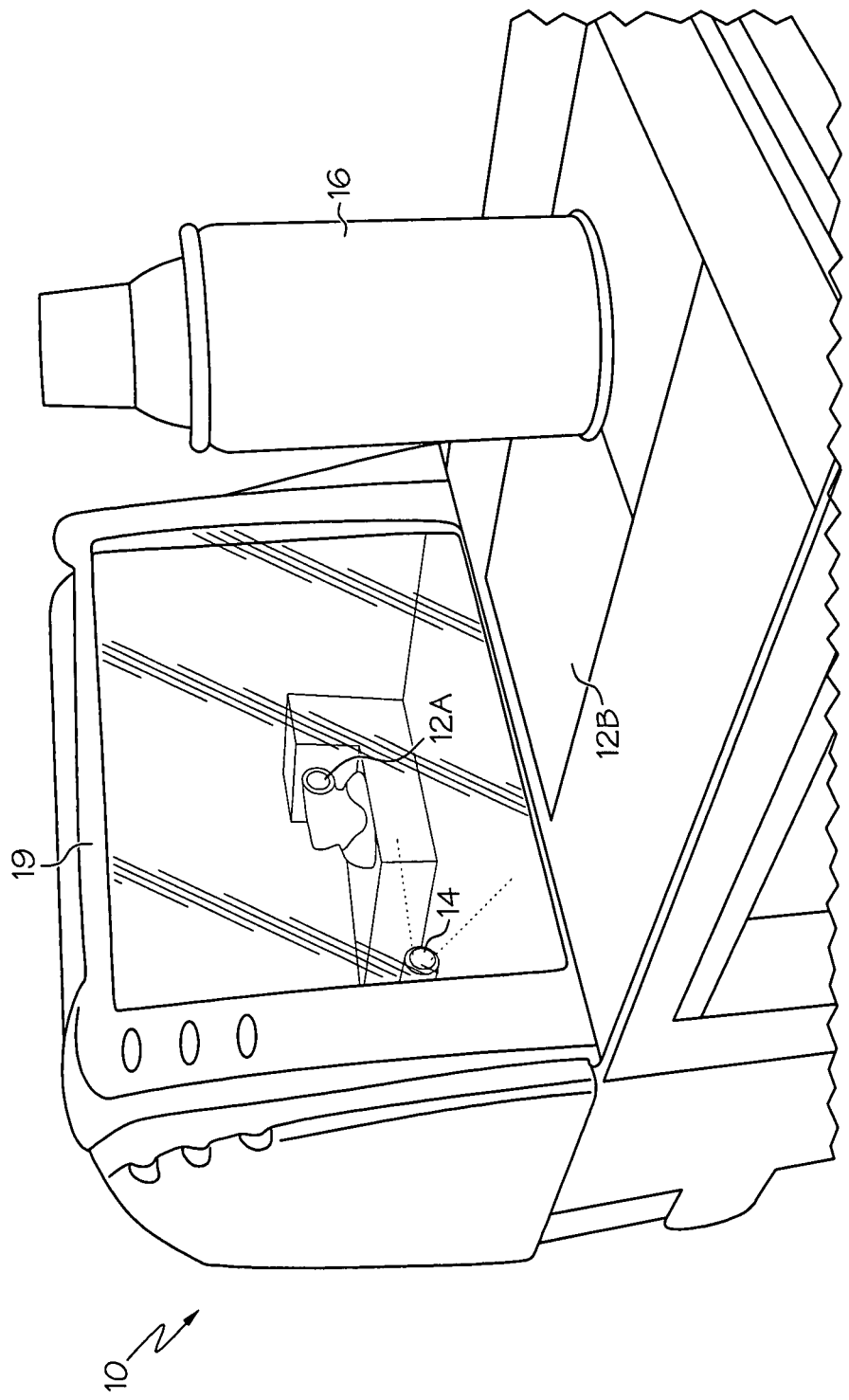
FIG. 1 depicts smart scanning system according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:

I. General Description
II. Computerized Implementation

I. General Description

As indicated above, the present invention provides a smart scanning system comprising an integrated scanning and image capture system in which one or more image capture device(s) (e.g., camera) and a barcode scanner are positioned within a common enclosure that is a component of a checkout station. The barcode of item is scanned and an image of the item is recorded. The identity of the item as determined based on the barcode is compared to an appearance of the item as determined based on its image. If the two are inconsistent, a discrepancy is registered. It is then determined whether the discrepancy is due to fraud (e.g., theft) or device error. In the case of the latter, the system can be updated to prevent a repeat of the error.

The integrated device of the present invention should not result in an increase of volume of the enclosure of previous systems that houses only barcode scanners. The enclosure of the present invention protects the image capture device(s) from collision, theft, dust and dirt, water and similar fluids, etc. The image capture device(s) are generally located and oriented so that (1) they fit inside the small, already-somewhat-full space, (2) they are pointed in such a way that they can usefully see the desired field of view, and (3) they do not interfere with the optical paths required by the pre-existing barcode scanner light source, mirrors, and reflected light intensity sensor. In addition, they do not require increasing the dimensions of glass used, so that no additional risk of glass breakage is incurred.

Referring now to FIG. 1, a smart scanning system 10 according to the present invention is shown. In general, smart scanning system 10 comprises an integrated scanning and image capture system. Specifically, smart scanning system 10 includes at least one barcode scanner 12A and/or 12B, at least one image capture device(s) 14 (e.g., a still image camera, a video camera, etc.), and barcode scanning and image processing software. At least one barcode scanner 12A and one image capture mechanism 14 of smart scanning system 10 are positioned within a common enclosure 19.

Image capture device(s) 14 is placed behind shield 17 (glass, plastic, etc.) as shown. Where multiple image capture devices 14 are used, one is placed is placed so that one looks out along a path more or less normal to the vertical glass surface of the barcode scanner, and the other looks more or less straight up from below the horizontal surface of the scanner. The latter image capture device is also placed off to one side, so that it is actually under the (e.g., steel) rim surrounding the existing shield 17 in that surface. As such, hole (e.g., 1" in diameter in an illustrative embodiment) is cut in the steel rim, and covered with a separate, transparent plate. Regardless (as stated above), smart scanning system 10 also includes barcode scanning and image processing software to perform the functions described herein. This software is stored on a memory medium that may or may not be positioned within enclosure.

Figure 3:
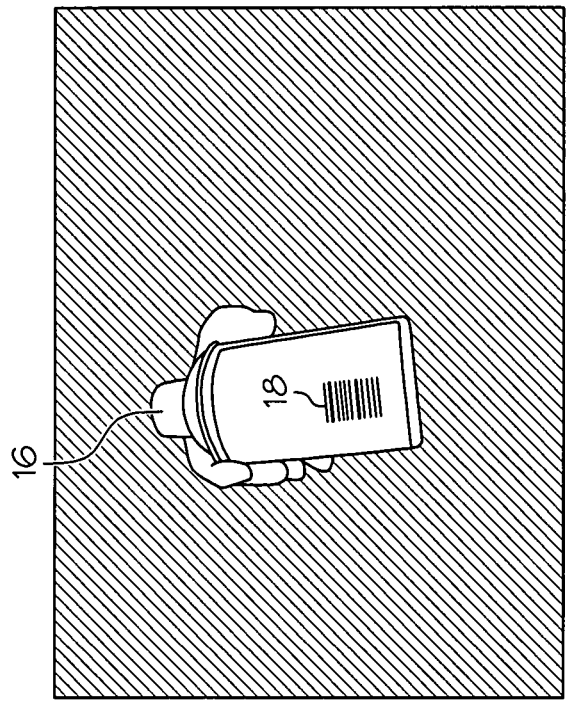
FIG. 3 depicts an item after being processed by the smart scanning system of FIG. 1 according to the present invention.
Figure 2:
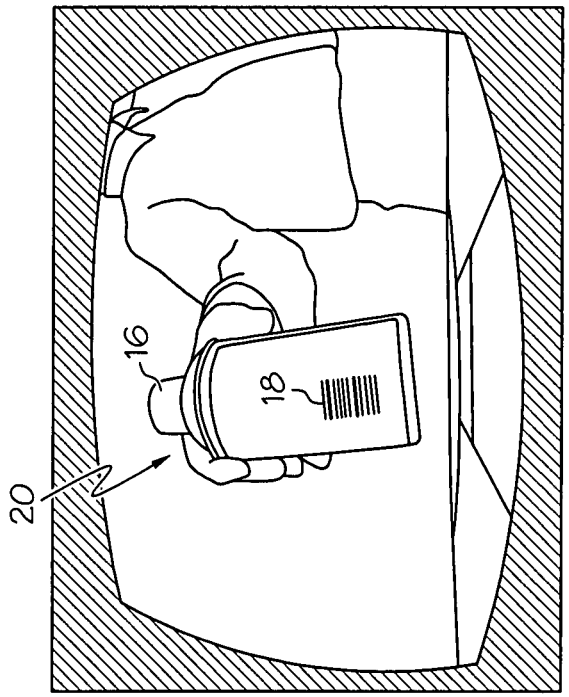
FIG. 2 depicts an item before being processed by the smart scanning system of FIG. 1 according to the present invention.

Referring now to FIGS. 2-3, the functions of smart scanning system 10 will be explained. Specifically, a scan of a barcode 18 of an item 16 (e.g., a consumer product) will be received the barcode scanner 12A and/or 12B (shown in FIG. 1). Based on the barcode 18, the barcode scanning software will determine an identity of item 16 (e.g., a bottle of X brand cola). This occurs via known means such as cross-referencing a table of barcode values to product identities.

Figure 4:
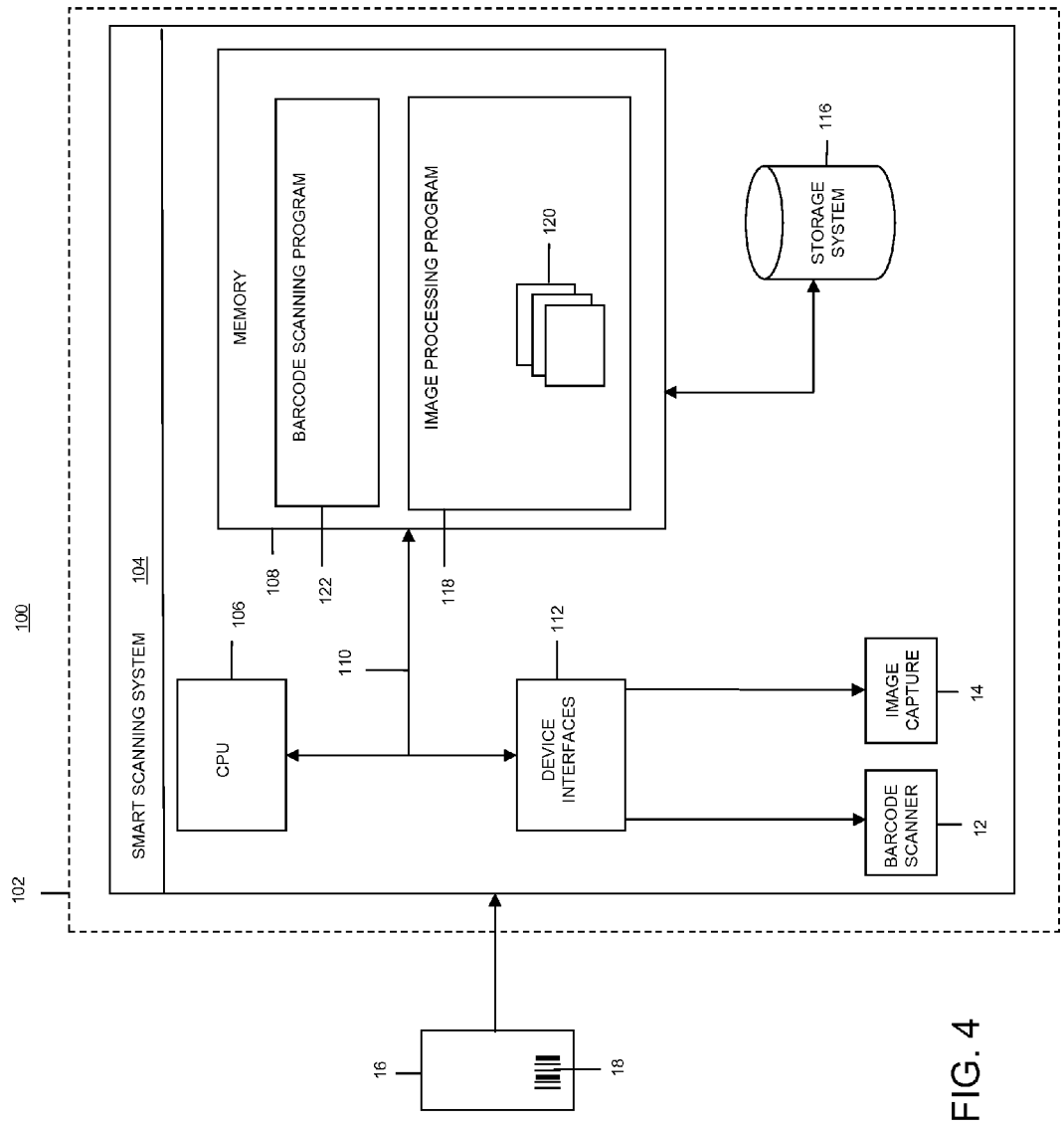
FIG. 4 depicts a more specific computerized implementation according to the present invention.

Before, after or simultaneous to the scan of the barcode), an image 20 of item 16 will be captured by image capture device 14 (shown in FIG. 1), and processed to determine an appearance of the item (which should be consistent with the identity as determined based on the scan of barcode 18). The sequence of capturing and processing the image is typically as follows: wait for low motion of item 16; take dark and bright pictures; segment item 16 from background 20, the results of which are shown in FIG. 4; extract at least one visual feature of item 16 and determine the identity based on those visual features. This determination can be based on comparison of the image to an electronic database or library of images associated with corresponding item identities. In addition, the appearance can be as general or as specific as desired. For example, the appearance can be specific so as to identify the item (e.g., a bottle of X brand cola), or it can be more general (e.g., a bottle of cola, or just cola based on the color).

Thereafter, smart scanning system 10 will compare the identity of item 16 as determined based on the scan of barcode 18 to the appearance as determined based on the image to determine if the two are consistent with one another. If not, smart scanning system 10 will register a discrepancy and providing a notification of the discrepancy (at least one of a visual notification and an audible notification). Where there is a discrepancy, smart scanning system 10 will then determine to determine whether the discrepancy is either error or fraud. For example, was the barcode tampered with or changed, or as the discrepancy due to device error. Where device error caused the discrepancy, smart scanning system 10 can be updated (e.g., in response to an operator's input) to reflect the true identity of the item and its association with the image just captured.

II. Computerized Implementation

II. Computerized Implementation

Referring now to FIG. 4, a computerized implementation 100 of the present invention is shown. As depicted, implementation 100 includes smart scanning system 10 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a standalone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, smart scanning system 10 includes a processing unit 106, a memory 108, a bus 110, and device interfaces 112. Further, smart scanning system 10 is shown having barcode scanner 12 and image capture device 14 and storage system 116 that communicate with bus via device interfaces (although barcode scanner 12 and/or image capture device 14 alternatively could directly communicate with bus 110). In general, processing unit 106 executes computer program code, such as image processing program 118 and barcode scanning program 122, which are stored in memory 108 and/or storage system 116. While executing computer program code, processing unit 106 can read and/or write data to/from memory 108, storage system 116, and/or device interfaces 112. Bus 110 provides a communication link between each of the components in smart scanning system 10. Although not shown, smart scanning system 10 could also include I/O interfaces that communicate with: one or more external devices such as a cash register, a keyboard, a pointing device, a display, etc.); one or more devices that enable a user to interact with smart scanning system 10; and/or any devices (e.g., network card, modem, etc.) that enable smart scanning system 10 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, smart scanning system 10 is only representative of various possible computer systems that can include numerous combinations of hardware. To this extent, in other embodiments, smart scanning system 10 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external device 114. Still further, it is understood that one or more additional components (e.g., system software, math co-processing unit, etc.) not shown in FIG. 4 can be included in smart scanning system 10.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into smart scanning system 10.

Shown in memory 108 of smart scanning system 10 is image processing program 118, which a set (at least one) of modules 120. The modules generally provide the functions of the present invention as described herein. Specifically (among other things), set of modules 120 is configured to: receive a scan of a barcode of item 16 via barcode scanner 12; determine an identity of the item based on the barcode; capture of an image of item 16 via image capture device 14; process the image (e.g., segment item 16 from the background, extract visual feature(s) of item 16); determine an appearance the item 16 based on the image; and determining whether the identity is consistent with the appearance; register a discrepancy if the identity is inconsistent with the appearance; determine whether the discrepancy is either an error or fraud; update the integrated scanning and image capture system to prevent the error from being repeated; provide a notification of the discrepancy, the notification being at least one of a visual notification and an audible notification.

While shown and described herein as a smart scanning system, method, and program item, it is understood that the invention further provides various alternative embodiments. For example, in one embodiment, the invention provides a computer-readable/useable medium that includes computer program code to enable a computer infrastructure to provide smart scanning. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 4) and/or storage system 116 (FIG. 4) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide smart scanning. In this case, the service provider can create, maintain, and support, etc., a computer infrastructure, such as computer infrastructure 102 (FIG. 4) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for smart scanning. In this case, a computer infrastructure, such as computer infrastructure 102 (FIG. 4), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as smart scanning system 10 (FIG. 4), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A smart scanning method, comprising:
   receiving a scan of a barcode of an item via a dedicated barcode scanner in an integrated scanning and image capture system;
   determining an identity of the item based on the barcode;
   capturing an image of the item from a substantially horizontal direction via a dedicated image capture device, which is not used to process barcodes, in the integrated scanning and image capture system, the image capture device being distinct from the barcode scanner and adjacent to the barcode scanner in a common enclosure that is affixed as a component of a checkout station;
   capturing a second image of the item from a substantially vertical direction below the item via a second dedicated image capture device, wherein the second dedicated image capture device is positioned substantially vertically below a horizontal surface of the common enclosure below an area of the item and facing in an upward direction, wherein the second image is captured through a hole in the common enclosure separate from a scanning window in the horizontal surface, which is not used to process barcodes, in the integrated scanning and image capture system, the second dedicated image capture device being distinct from the barcode scanner and the image capture device and physically separate from the barcode scanner and the image capture device and is affixed as a component of a checkout station; and
   determining whether the identity is consistent with an appearance of the item as determined from the image and the second image.

2. The smart scanning method of claim 1, further comprising:
   registering a discrepancy if the identity is inconsistent with the appearance; and
   providing a notification of the discrepancy, the notification being at least one of a visual notification or an audible notification.

3. The smart scanning method of claim 2, further comprising:
   determining a true identity of the item if the identity is inconsistent with the appearance to determine whether the discrepancy is either error or fraud; and
   updating the integrated scanning and image capture system to avoid a repeat of the discrepancy if the discrepancy is an error.

4. The smart scanning method of claim 1, the image capture device and the second image capture device being selected from a group consisting of a still image camera or a video camera.

5. The smart scanning method of claim 1, further comprising:
   segmenting the image from a background; and
   extracting at least one visual feature of the item to determine the appearance.

6. A smart scanning system, comprising:
   a module for receiving a scan of a barcode of an item via a dedicated barcode scanner in an integrated scanning and image capture system;
   a module for determining an identity of the item based on the barcode; a module for capturing an image of the item from a substantially horizontal direction via a dedicated image capture device, which is not used to process barcodes, in the integrated scanning and image capture system, the image capture device being distinct from the barcode scanner and adjacent to the barcode scanner in a common enclosure that is affixed as a component of a checkout station;
   capturing a second image of the item from a substantially vertical direction below the item via a second dedicated image capture device, wherein the second dedicated image capture device is positioned substantially vertically below a horizontal surface of the common enclosure below an area of the item and facing in an upward direction, wherein the second image is captured through a hole in the common enclosure separate from a scanning window in the horizontal surface, which is not used to process barcodes, in the integrated scanning and image capture system, the second dedicated image capture device being distinct from the barcode scanner and the image capture device and physically separate from the barcode scanner and the image capture device and is affixed as a component of a checkout station; and a module for determining whether the identity is consistent with an appearance of the item as determined from the image and the second image.

7. The smart scanning system of claim 6, further comprising:
a module for registering a discrepancy if the identity is inconsistent with the appearance; and
a module for providing a notification of the discrepancy, the notification being at least one of a visual notification or an audible notification.

8. The smart scanning system of claim 7, further comprising:
a module for determining a true identity of the item if the identity is inconsistent with the appearance to determine whether the discrepancy is either error or fraud; and
a module for updating the integrated scanning and image capture system to avoid a repeat of the discrepancy if the discrepancy is an error.

9. The smart scanning system of claim 6, the image capture device being a still image capture device.

10. The smart scanning system of claim 6, the image capture device being a video image capture device.

11. An integrated scanning and image capture system, comprising:
a dedicated barcode scanner for scanning a barcode of an item;
a dedicated image capture device, which is not used to process barcodes, the image capture device being distinct from the barcode scanner and adjacent to the barcode scanner, for capturing an image of the item from a substantially horizontal direction, the barcode scanner and the image capture device both being positioned within a common enclosure that is affixed as a component of a checkout station; and
a second dedicated image capture device, which is not used to process barcodes, the second dedicated image capture device being distinct from the barcode scanner and the image capture device and physically separate from the barcode scanner and the image capture device and being affixed as a component of a checkout station with a location outside the common enclosure, for capturing a second image of the item from a substantially vertical direction below the item, wherein the second dedicated image capture device is positioned substantially vertically below a horizontal surface of the common enclosure below an area of the item and facing in an upward direction, wherein the second image is captured through a hole in the common enclosure separate from a scanning window in the horizontal surface.

12. The integrated scanning and image capture system of claim 11, further comprising a set of modules being configured to:
determine an identity of the item based on the barcode;
determine an appearance of the item based on the image;
compare the identity to the appearance; and
determine whether the identity is consistent with the appearance.

13. The integrated scanning and image capture system of claim 12, the set of modules being further configured to:
register a discrepancy if the identity is inconsistent with the appearance;
determine whether the discrepancy is either an error or fraud; and
update the integrated scanning and image capture system to prevent the error from being repeated.

14. The integrated scanning and image capture system of claim 12, the set of modules being further configured to provide a notification of the discrepancy.

15. The integrated scanning and image capture system of claim 14, the notification being at least one of a visual notification or an audible notification.

16. A method for deploying a smart scanning system, comprising: providing a computer infrastructure being operable to:
receive a scan of a barcode of an item via a dedicated barcode scanner in an integrated scanning and image capture system;
determine an identity of the item based on the barcode;
capture an image of the item from a substantially horizontal direction via a dedicated image capture device, which is not used to process barcodes, in the integrated scanning and image capture system, the image capture device being distinct from the barcode scanner and adjacent to the barcode scanner in a common enclosure that is affixed as a component of a checkout station;
capture a second image of the item from a substantially vertical direction below the item via a second dedicated image capture device, which is not used to process barcodes, in the integrated scanning and image capture system, the second dedicated image capture device being distinct from the barcode scanner and the image capture device and physically separate from the barcode scanner and the image capture device and is affixed as a component of a checkout station with a location outside the common enclosure, wherein the second dedicated image capture device is positioned substantially vertically below a horizontal surface of the common enclosure below an area of the item and facing in an upward direction, wherein the second image is captured through a hole in the common enclosure separate from a scanning window in the horizontal surface; and
determine whether the identity is consistent with an appearance of the item as determined from the image and the second image.

17. The method for claim 16, the computer infrastructure being further operable to:
register a discrepancy if the identity is inconsistent with the appearance;
determine whether the discrepancy is either an error or fraud; and
update the integrated scanning and image capture system to prevent the error from being repeated.

18. The method of claim 16, the computer infrastructure being further operable to provide a notification of the discrepancy.

19. The method for claim 18, the notification being at least one of a visual notification or an audible notification.

* * * * *